US010335872B2

(12) United States Patent
Oikawa et al.

(10) Patent No.: US 10,335,872 B2
(45) Date of Patent: Jul. 2, 2019

(54) CUTTING INSERT HAVING ARC-SHAPED CUTTING EDGES AND INCLINED SEATING SURFACES, TOOL BODY AND CUTTING TOOL

(71) Applicant: TUNGALOY CORPORATION, Fukushima (JP)

(72) Inventors: Yuki Oikawa, Iwaki (JP); Ryuichi Saji, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 207 days.

(21) Appl. No.: 15/307,519

(22) PCT Filed: Nov. 26, 2015

(86) PCT No.: PCT/JP2015/083240
§ 371 (c)(1),
(2) Date: Oct. 28, 2016

(87) PCT Pub. No.: WO2016/084898
PCT Pub. Date: Jun. 2, 2016

(65) Prior Publication Data
US 2017/0050249 A1 Feb. 23, 2017

(30) Foreign Application Priority Data
Nov. 27, 2014 (JP) .................. 2014-239427

(51) Int. Cl.
*B23C 5/20* (2006.01)
*B23C 5/10* (2006.01)
(52) U.S. Cl.
CPC ............... *B23C 5/207* (2013.01); *B23C 5/10* (2013.01); *B23C 5/109* (2013.01); *B23C 5/1027* (2013.01);
(Continued)

(58) Field of Classification Search
CPC ....... B23C 5/207; B23C 5/1027; B23C 5/109; B23C 5/20; B23C 5/10; B23C 2200/045; B23C 2200/203
See application file for complete search history.

(56) References Cited

U.S. PATENT DOCUMENTS 5,100,269 A * 3/1992 Lyon .................. B23B 27/045
407/107
5,542,795 A 8/1996 Mitchell
(Continued)

FOREIGN PATENT DOCUMENTS

DE           103 20 173 A1    9/2004
DE    20 2010 017 106 U1     3/2011
(Continued)

OTHER PUBLICATIONS

Extended European Search Report (EESR) dated Oct. 18, 2017, from corresponding EP Appl No. 15863062.4, 16 pp.
(Continued)

*Primary Examiner* — Alan Snyder
(74) *Attorney, Agent, or Firm* — Studebaker & Brackett PC

(57) ABSTRACT

A cutting insert has first and second end surfaces, a peripheral side surface, a reference central axis A perpendicular to and passing through the two surfaces, and a cutting edge having at least one circular-arc-shaped cutting edge. A contact surface portion is formed in the second end surface. The arc-shaped cutting edge is part of virtual circle having a center E which is spaced apart from the central axis A. A longitudinal plane B includes the central axis A and the center E; a median plane C perpendicular to the central axis A passes midway between the two end surfaces; and a virtual plane D perpendicular to both the longitudinal plane B and the median plane C, intersects the circular-arc-shaped cutting edge and traverses the contact surface portion. In a
(Continued)

cross-section along the virtual plane D, the contact surface portion is inclined relative to the median plane C.

18 Claims, 11 Drawing Sheets

(52) U.S. Cl.
CPC .......... *B23C 5/20* (2013.01); *B23C 2200/045* (2013.01); *B23C 2200/203* (2013.01)

(56) References Cited

U.S. PATENT DOCUMENTS

| | | | |
|---|---|---|---|
| 5,913,643 | A | 6/1999 | Fowler et al. |
| 5,944,456 | A | 8/1999 | Shirley et al. |
| 6,715,968 | B1 * | 4/2004 | Tagtstrom ............. B23B 27/045 |
| | | | 407/116 |
| 7,713,005 | B2 | 5/2010 | Rieth |
| 7,735,401 | B2 | 6/2010 | Stojanovski |
| 8,696,263 | B2 * | 4/2014 | Saji ..................... B23C 5/109 |
| | | | 407/113 |
| 2004/0208713 | A1 | 10/2004 | Duerr et al. |
| 2012/0070239 | A1 | 3/2012 | Park et al. |
| 2014/0341661 | A1 | 11/2014 | Lin et al. |
| 2016/0082527 | A1 | 3/2016 | Komiyama |

FOREIGN PATENT DOCUMENTS

| | | |
|---|---|---|
| JP | WO2013-039090 A1 | 3/2013 |
| JP | 2014-193491 A | 10/2014 |
| WO | 00/13824 A1 | 3/2000 |
| WO | 20014/104667 A1 | 7/2014 |

OTHER PUBLICATIONS

International Search Report dated Jan. 12, 2016 issued in counterpart International (PCT) Application (No. PCT/JP2015/083240).
Written Opinion dated Jan. 12, 2016 issued in counterpart International (PCT) Application (No. PCT/JP2015/083240).

* cited by examiner

CUTTING INSERT HAVING ARC-SHAPED CUTTING EDGES AND INCLINED SEATING SURFACES, TOOL BODY AND CUTTING TOOL

RELATED APPLICATIONS

This is a 371 US National Phase of International Patent Application No. PCT/JP2015/083240 filed Nov. 26, 2015, and published as WO 2016/084898A1 on Jun. 2, 2016, which claims priority to JP 2014-239,427, filed Nov. 27, 2014. The contents of the aforementioned applications are incorporated by reference in their entirety.

TECHNICAL FIELD

The present invention relates to a cutting insert which is removably mounted on a cutting tool, a tool body on which such cutting insert is mounted, and a cutting tool.

BACKGROUND ART

A cutting tool which uses a cutting insert having a circular-arc-shaped cutting edge is widely used as it is suited for use in three-dimensional machining of shapes. A ball end mill and a radius end mill, etc., are known as this type of cutting tool. A cutting insert having a circular-arc-shaped cutting edge can be used suitably for copy machining, etc., not only for a rotary cutting tool but also for a cutting tool for lathes. The peripheral side surface of such cutting insert having a circular-arc-shaped cutting edge has a curved face which corresponds to the circular arc shape of the cutting edge.

If a plurality of circular-arc-shaped cutting edges is provided in the cutting insert, a part of the peripheral side surface of the cutting insert which comes into contact with the wall surface of an insert seat of a tool body may be a curved face corresponding to the circular arc shape of the cutting edge. In that case, the cutting insert is likely to be fixed unstably and may be shifted in the direction of rotation during cutting. For example, Patent Document 1 proposes a cutting insert and a cutting tool involving a measure for preventing rotation of the cutting insert in the rotating direction. The cutting insert 1 in Patent Document 1 comprises two circular end surfaces and a peripheral side surface and has circular-arc-shaped cutting edges which are formed in an intersecting edge between the peripheral side surface and the two end surfaces. By forming a plurality of flat portions on part of the peripheral side surface and bringing the flat portions into contact with the wall surface of an insert seat, shifting of the cutting insert in the rotating direction is suppressed.

Patent Document 2 describes another example of conventional cutting inserts and cutting tools. The cutting insert in Patent Document 2 comprises a first end surface, a second end surface and a peripheral side surface, and has a plurality of cutting edges formed in an intersecting edge between the first end surface and the peripheral side surface. In an embodiment in Patent Document 2, the cutting insert is formed, for example, in a shape of 120-degree rotational symmetry, i.e., 3-fold rotational symmetry, with respect to the axis passing through the first and second end surfaces. The second end surface serves as a surface to be seated onto an insert seat. A plurality of contact surface portions is formed on the second end surface. In a side view, the cutting edge has a portion which is inclined so as to be closer to the second end surface. In a side view, the contact surface portion has a portion which is inclined in the same direction as the direction of the inclined portion of the cutting edge.

CITATION LIST

Patent Documents

Patent Document 1: JP2012-525268 T
Patent Document 2: WO2013/039090

SUMMARY

Technical Problem

The cutting insert and cutting tool disclosed in Patent Document 1, having the flat portions provided as a contact surface in the peripheral side surface, bring about effects of suppressing shifting of the cutting insert during cutting. However, due to the flat portions provided on the peripheral side surface of the cutting insert, a thin part is generated around the cutting edge above and below the flat portion. As a result, the cutting edge will be prone to fracture in machining with a high load; therefore, there is still room for improvement. The cutting insert and cutting tool in Patent Document 2 also bring about effects of suppressing shifting of the cutting insert during cutting. However, as for shifting of the cutting insert in the rotating direction, it is necessary to provide a configuration for preventing rotation separately from the contact surface portion; therefore, there is still room for improvement. If the cutting insert is shifted during cutting, the cutting insert may be abnormally damaged, or the machining accuracy of the workpiece may be deteriorated.

An object of the present invention is to provide a cutting insert which can adequately suppress shifting of the cutting insert during cutting without reducing the thickness around a cutting edge. Another object of the present invention is to provide a tool body and a cutting tool on which a cutting insert according to the present invention can be removably mounted.

Solution to Problem

A cutting insert according to the present invention comprises first and second end surfaces, a peripheral side surface extending between the first and second end surfaces, and a cutting edge formed at least in part of an intersecting edge between the first end surface and the peripheral side surface, wherein the cutting insert comprises: the cutting edge which includes at least one circular-arc-shaped cutting edge; and a contact surface portion formed in the second end surface. In the cutting insert, when a reference axis A is defined as a line passing through the center of the first end surface and being perpendicular to the first end surface, and when a virtual circle is defined so that the virtual circle includes, as its arc, a first circular-arc-shaped cutting edge which is one of the circular-arc-shaped cutting edges, as viewed from a direction facing the first end surface, then, the center of the virtual circle is apart from the reference axis A. When a first reference plane B is defined as a plane including the reference axis A and extending through the center of the virtual circle; a second reference plane C is defined as a plane extending perpendicularly to the reference axis A and arranged on the first end surface side with respect to the second end surface; and a virtual plane D is defined as a plane orthogonal to both the first reference plane B and the second reference plane C and extending so as to intersect with the first circular-arc-shaped cutting edge and traverse the contact surface portion, then, in the virtual plane D, the contact surface portion has a portion which is inclined so as to gradually become more distant from the second reference plane C heading from one end to the other.

A tool body according to the present invention is a tool body on which a cutting insert according to the present invention is mounted, the tool body comprising at least one insert seat. The insert seat has a holding surface portion which comes into contact with at least one contact surface portion.

A cutting tool according to the present invention comprises a tool body having at least one insert seat, and a cutting insert which is removably mounted on the insert seat. Such cutting insert is a cutting insert according to the present invention. The insert seat has a holding surface portion which comes into contact with at least one contact surface portion.

Advantageous Effects of Invention

The cutting insert according to the present invention is formed so that the contact surface portion in the second end surface, which is able to be in contact with the bottom surface of the insert seat of the tool body, is inclined relative to the direction of rotation of the cutting insert. Further, the holding surface portion in the bottom surface of the insert seat, which comes into contact with the contact surface portion, also has a corresponding inclination. Accordingly, when cutting resistance is applied during cutting, generation of a force in a direction to shift the cutting insert can be suppressed between the contact surface portion of the cutting insert and the holding surface portion of the insert seat, and, as a result, shifting of the cutting insert can be suppressed. In other words, the cutting insert can be prevented from being abnormally damaged, or the machining accuracy of the workpiece can be increased.

DESCRIPTION OF EMBODIMENTS

Figure 5:
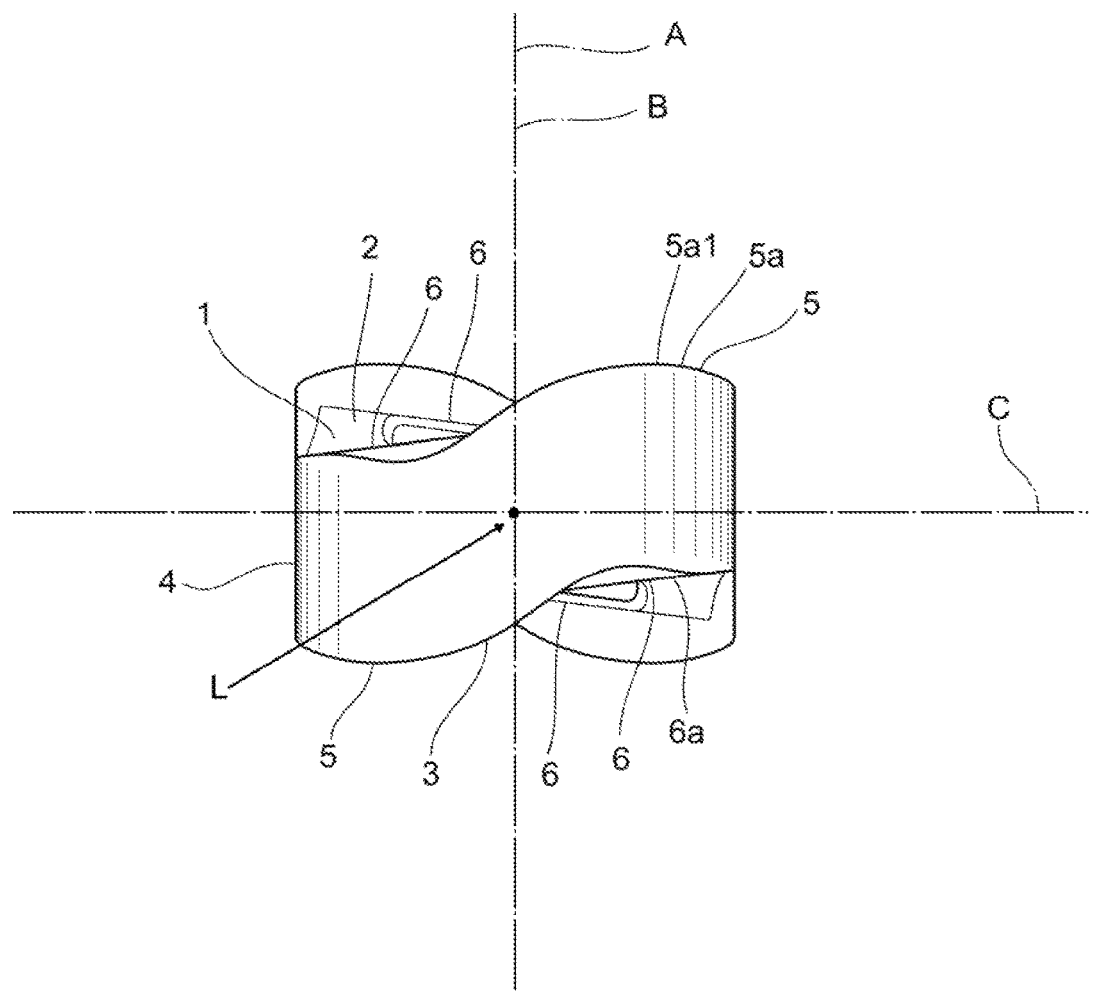
FIG. 5 is a front view of the cutting insert in FIG. 4.
Figure 6:
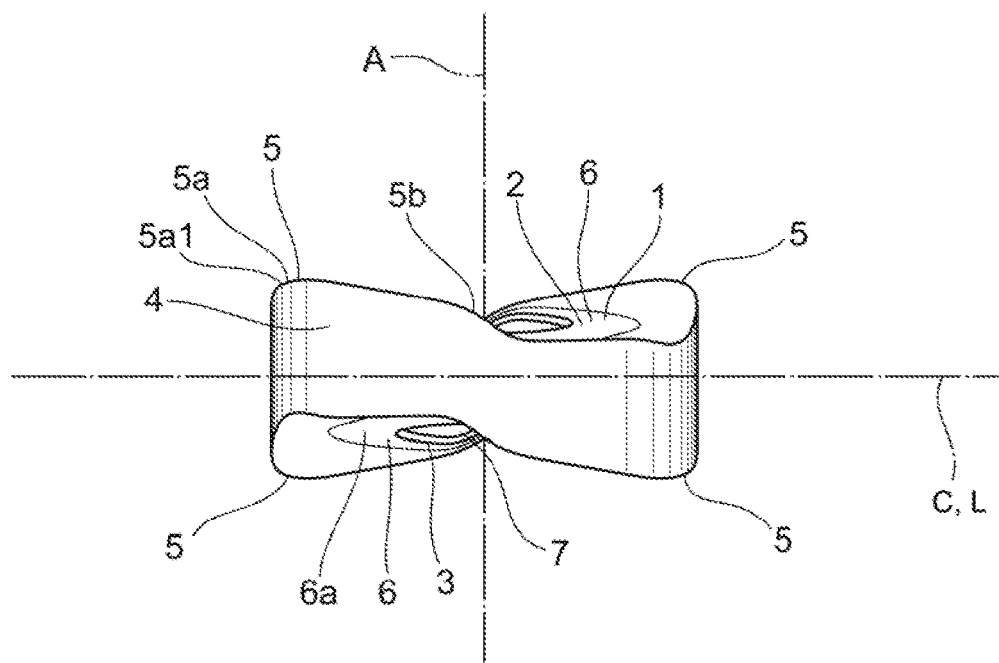
FIG. 6 is a right side view of the cutting insert in FIG. 4.
Figure 7:
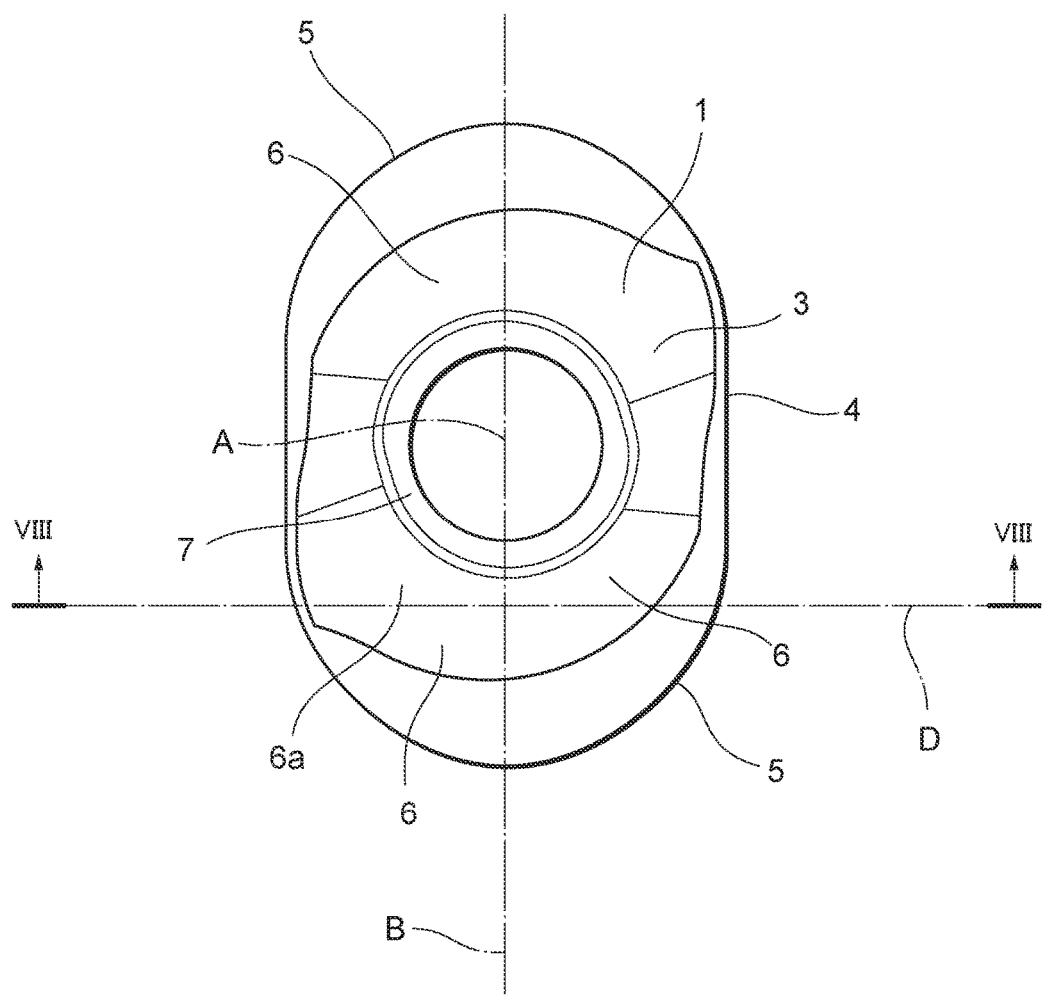
FIG. 7 is a bottom view of the cutting insert in FIG. 4.
Figure 8:
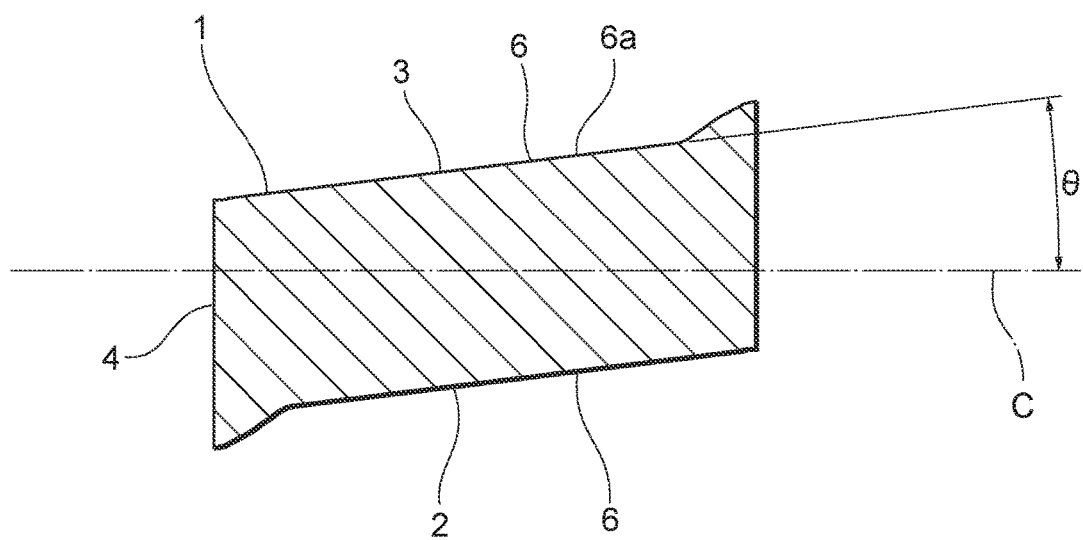
FIG. 8 is a sectional view cut along the line Vlll-Vlll in FIG. 7.
Figure 9:
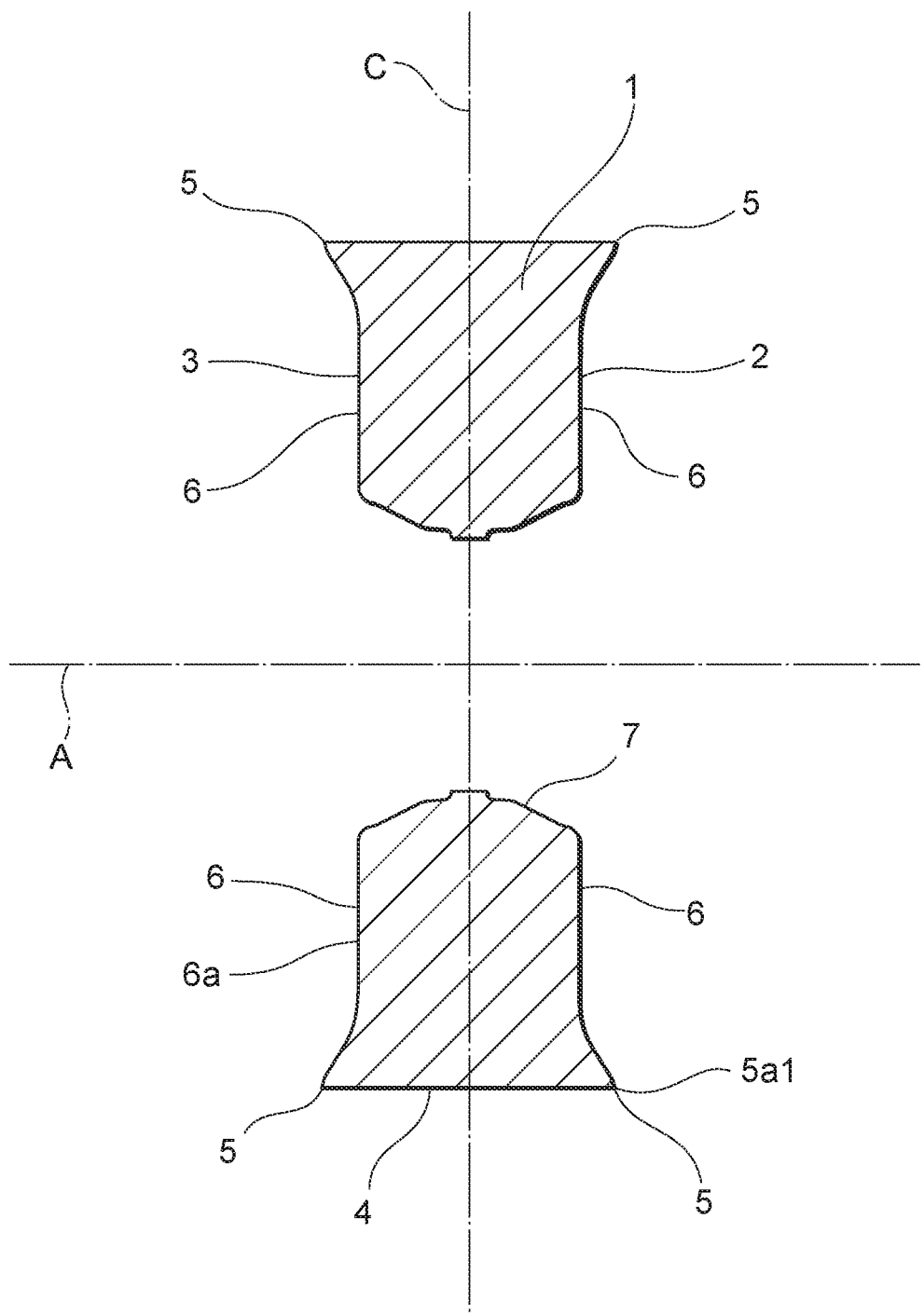
FIG. 9 is a sectional view cut along the line IX-IX in FIG. 4.

Hereinafter, embodiments of the present invention will be described by referring to the attached drawings as required. FIGS. 1 and 4 to 9 illustrate a cutting insert 1 according to the present embodiment. FIG. 9 is a sectional view cut along the line IX-IX in FIG. 4. In the plan view of FIG. 4, when the center of the arc of a first circular-arc-shaped cutting edge 5a1, which will be described later, is defined as a center E, and when a first reference longitudinal plane B is defined as a plane including reference central axis A and passing through the arc center E of the first circular-arc-shaped cutting edge 5a1, the cut plane along the line IX-IX corresponds to the first reference longitudinal plane B. A virtual plane orthogonal to the reference central axis A and passing midway between two end surfaces 2, 3, (upper surface and lower surface, respectively) is defined as a second reference median plane C, as shown in FIGS. 5 and 6. As seen in FIG. 5, the longitudinal plane B and the median plane C intersect to form the insert's longitudinal axis L. FIG. 8 is a sectional view cut along the line VIII-VIII in FIG. 7. When a virtual plane orthogonal to both the first reference longitudinal plane B and the second reference median plane C and extending so as to intersect with the first circular-arc-shaped cutting edge 5a1 (which will be described later) and traverse a contact surface portion 6 (which will also be described later) is defined as a virtual plane D, the cut plane along the line VIII-VIII corresponds to the virtual plane D. In other words, the line VIII-VIII is a cutting-plane line in the shorter-side direction which is orthogonal to the longer-side direction in FIG. 4. The back view and left side view of the cutting insert 1 are not shown herein since they are the same as the front view and the right side view, respectively.

Figure 4:
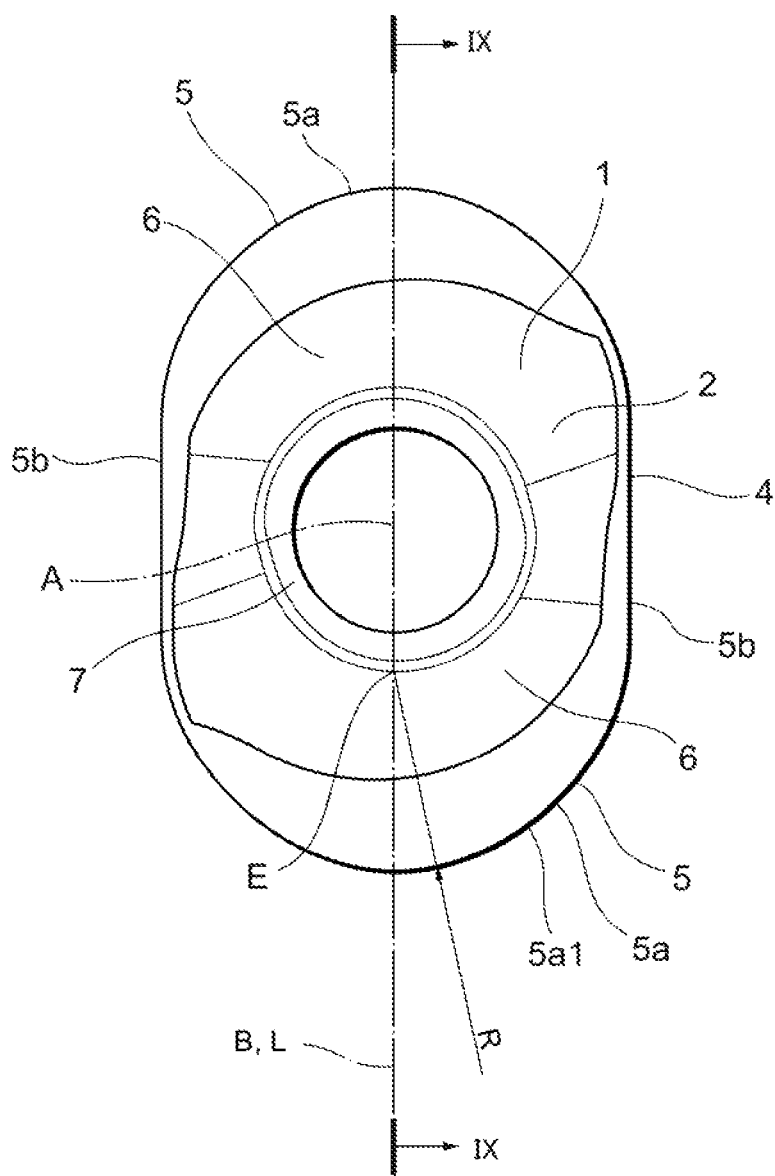
FIG. 4 is a plan view of the cutting insert in FIG. 1.

As illustrated in FIG. 4, the cutting insert 1 of the present embodiment has a substantially elliptic shape in a plan view. The term "substantially elliptic" means a shape having two substantially semicircular parts in which the semicircular parts do not share their centers so that the two substantially semicircular parts are connected with two substantially linear parts. The substantially linear parts are smoothly tangential to each of the substantially semicircular parts. Here, the longer-side direction of the ellipse is defined in a plan view as a direction extending from the reference axis A to the center of a virtual circle which has, as its arc, the curved line along the substantially semicircular part (hereinafter referred to as the "center of the semicircular arc"). To put it another way, the longer-side direction of the ellipse is defined in a plan view as a direction extending from the center of one semicircular arc to the center of the other semicircular arc.

The cutting insert 1 includes two end surfaces 2 and 3 which substantially face each other, i.e. which are arranged on substantially opposite sides from each other, and a peripheral side surface 4 extending between the two end surfaces. The cutting insert 1 is formed in a shape of 180-degree rotational symmetry, i.e., a shape of 2-fold rotational symmetry, with respect to the reference axis A that penetrates the two end surfaces 2 and 3. In other words, in a plan view, the respective centers E of the arcs in the two substantially semicircular parts are apart from the reference axis A by the same distance in the opposite directions. In addition, the curvature radius R of the arcs in the two substantially semicircular parts is the same. The reference axis A passes through the center of each of the first and second end surfaces 2 and 3. A mounting hole 7 is formed so as to extend through the two end surfaces 2 and 3 and arranged so that the axis of the mounting hole 7 corresponds to the reference axis A of the cutting insert 1. The reference axis A extends perpendicularly to the first end surface 2. The first end surface 2 and the second end surface 3 are arranged parallel to each other. Accordingly, the reference axis A extends perpendicularly to the second end surface 3 as well.

The cutting insert 1 is formed so as to have the same shape when it is rotated 180 degrees around an axis orthogonal to the reference axis A so as to reverse the two end surfaces 2 and 3.

For ease of description, one end surface 2 of the two end surfaces 2 and 3 is hereinafter referred to as an "upper surface" (corresponding to the "first end surface" of the present invention), and the other end surface 3 of the two end surfaces 2 and 3 is hereinafter referred to as a "lower surface" (corresponding to the "second end surface" of the present invention). Further, the direction from the lower surface 3 to the upper surface 2 along the direction of the reference axis A is referred to as an "upward direction," while the direction from the upper surface 2 to the lower surface 3 along the direction of the reference axis A is referred to as a "downward direction." It should be noted, however, that the words "upper/upward" and "lower/downward" do not limit the present invention and that the present invention should not be interpreted narrowly based on those words.

In the cutting insert 1 of the present embodiment, a cutting edge 5 is formed in and along an intersecting edge between the upper surface 2 and the peripheral side surface 4. In other words, a rake surface is formed in the upper surface 2, a flank is formed on the peripheral side surface 4, and a cutting edge 5 is formed in an intersecting edge between the rake surface and the flank. The cutting edge 5 is generally comprised of two portions 5a and 5b. As described above, the contour shape of the upper surface 2 includes substantially semicircular portions and substantially linear portions. In the cutting edge 5 in a plan view, the portion of the cutting edge 5 corresponding to the substantially semicircular portion is referred to as a circular-arc-shaped cutting edge 5a, while the remaining portion of the cutting edge 5 corresponding to the substantially linear portion is referred to as a linear cutting edge 5b. The linear cutting edge 5b may also be referred to as a second cutting edge 5b. The circular-arc-shaped cutting edge 5a is formed so that, in a plan view, the length along the circular-arc-shaped cutting edge 5a is longer than the length of the linear cutting edge 5b. In other words, the cutting edge 5 is configured such that it is mainly the circular-arc-shaped cutting edge 5a that functions. In the cutting insert 1 of the present embodiment, the curvature radius R of the arc of the circular-arc-shaped cutting edge 5a is about 4 mm in a plan view. Accordingly, the length along the circular-arc-shaped cutting edge 5a is about 12 mm. The length of the linear cutting edge 5b is about 5 mm in a plan view. It should be noted, however, that each length is not limited to the above. Each size of the cutting edge 5 can be adjusted as appropriate according to the shape of the workpiece, etc. Moreover, in the cutting insert 1 of the present embodiment, the cutting edge 5 is formed in the entire part of the intersecting edge between the upper surface 2 and the peripheral side surface 4; however, the configuration is not limited thereto. The cutting edge 5 may be formed in only a part of the intersecting edge. Although not shown in the drawings, if the cutting edge 5 is formed in only a part of the intersecting edge between the peripheral side surface 4 and the top and lower surfaces 2 and 3, it is preferable to form a curved connecting portion in the remaining part of the intersecting edge so as to smoothly connect each of the cutting edges 5.

Attention is now directed to a plan view of the cutting insert 1 (FIG. 4). When the substantially semicircular portion is approximated into a single circular arc and when the center of a virtual circle having such circular arc as its arc is defined as a point E, a virtual plane which passes through the above point E and includes the reference axis A can be defined as a first reference plane B, as described above. Here, one of the circular-arc-shaped cutting edges 5a, which corresponds to the substantially semicircular portions from which the above center point E has been determined, will be specifically referred to as a first circular-arc-shaped cutting edge 5a1. Next, a virtual plane which extends perpendicularly to the reference axis A and is arranged on the upper surface 2 side with respect to the lower surface 3 can be defined as a second reference plane C. As shown in FIGS. 5 and 6, in this example, the second reference plane C is defined in the middle of the upper surface 2 and the lower surface 3, i.e., at a position that divides the cutting insert 1 into two substantially equal parts. In the cutting insert 1 of the present embodiment, the second reference plane C passes through the peripheral side surface 4, but does not intersect with either the upper surface 2 or the lower surface 3. In addition, a virtual plane which is orthogonal to both the first reference plane B and the second reference plane C and which extends so as to intersect with the first circular-arc-shaped cutting edge 5a1 and traverse a contact surface portion 6 (which will be described later) can be defined as a virtual plane D. That is, at least one contact surface portion 6 is formed on the reverse side of the corresponding rake surface of the first circular-arc-shaped cutting edge 5a1.

In a side view of the insert along the longitudinal axis L (a view seen from the front) in FIG. 5 in which the cutting edge 5 including the first circular-arc-shaped cutting edge 5a1 is viewed from the direction that faces the virtual plane D, the first circular-arc-shaped cutting edge 5a1 is formed so as to be generally inclined relative to the second reference median plane C. In other words, the first circular-arc-shaped cutting edge 5a1 has an apex on the upper right side in FIG. 5, the apex being a point at which the first circular-arc-shaped cutting edge 5a1 is the most distant from the second reference median plane C. The first circular-arc-shaped cutting edge 5a1 has an inclined portion which gradually approaches the second reference median plane C heading from the apex toward the first reference longitudinal plane B. At the same time, the first circular-arc-shaped cutting edge 5a1 also has an inclined portion which gradually approaches the second reference median plane C heading from the apex toward the linear cutting edge 5b. The angle of inclination of the first circular-arc-shaped cutting edge 5a1 in FIG. 5 reaches a maximum value at a portion that crosses the first reference longitudinal plane B, and, on both sides of that portion, the first circular-arc-shaped cutting edge 5a1 comes close to a state substantially parallel to the second reference median plane C. Accordingly, in FIG. 5, the first circular-arc-shaped cutting edge 5a1 is curved in a substantially S-shape so as to project most outwardly (upward direction) at the apex.

In FIG. 6 which is a right side view, the first circular-arc-shaped cutting edge 5a1 is inclined so as to approach the second reference plane C heading from the apex toward the linear cutting edge 5b. In other words, the first circular-arc-shaped cutting edge 5a1 is formed so as to be inclined relative to the second reference plane C in FIG. 6 as well. In the cutting insert 1 of the present embodiment, since the second reference plane C is parallel to the lower surface 3, the first circular-arc-shaped cutting edge 5a1 is inclined so as to approach the lower surface 3 heading from the apex toward the linear cutting edge 5b. The cutting insert 1 of the present embodiment is formed so that the linear cutting edge 5b is also inclined, in FIG. 6, relative to the second reference plane C. To be more specific, the linear cutting edge 5b is inclined so as to approach the second reference plane C as it heads away from the first circular-arc-shaped cutting edge 5*a*1. Further, in FIG. 6, one cutting edge 5 is inclined so that its circular-arc-shaped cutting edge 5*a* and linear cutting edge 5*b* are continuously inclined in the same direction, and so that it extends toward the adjacent cutting edge 5.

The cutting insert 1 of the present embodiment has two sets, i.e., two cutting edges 5 formed on the upper surface 2 side. Accordingly, two circular-arc-shaped cutting edges 5*a* and two linear cutting edges 5*b* are formed. In the cutting insert 1 of the present embodiment, cutting edges 5 are also formed at an intersecting edge between the lower surface 3 and the peripheral side surface 4 in a similar manner to those on the upper surface 2 side. In other words, rake surfaces are also formed in the lower surface 3. Each of the cutting edges 5 is formed so that the same shape is generated when the cutting insert 1 is rotated 180 degrees about an axis orthogonal to the reference axis A such that the upper surface 2 and the lower surface 3 are reversed. Thus, four sets of cutting edges 5 are formed in total. Accordingly, the cutting insert 1 is economical since it can be used at least four times—twice by using the upper surface 2 side and twice by reversing the cutting insert and using the lower surface 3 side. The below description will be made only for the case where one cutting edge 5 on the upper surface 2 side is used. Since the other three cutting edges 5 are used in a similar manner, description thereof will be omitted here. The circular-arc-shaped cutting edge 5*a* of the working cutting edge which is used in the below description is assumed to be the above-described first circular-arc-shaped cutting edge 5*a*1. In the foregoing description, the first circular-arc-shaped cutting edge 5*a*1, which is one of the circular-arc-shaped cutting edges 5*a*, has been described regarding its shape, and since the remaining three circular-arc-shaped cutting edges 5*a* are the same as the first circular-arc-shaped cutting edge 5*a*1, the descriptions thereof will be omitted here. It should be noted that the shapes of the cutting edges of the cutting insert according to the present invention are not limited to the above-described shapes of the cutting insert 1. Whether or not the cutting edges 5 have inclination, as well as the angles of inclination, etc., may be adjusted as appropriate according to the workpiece material and the cutting conditions.

Figure 10:
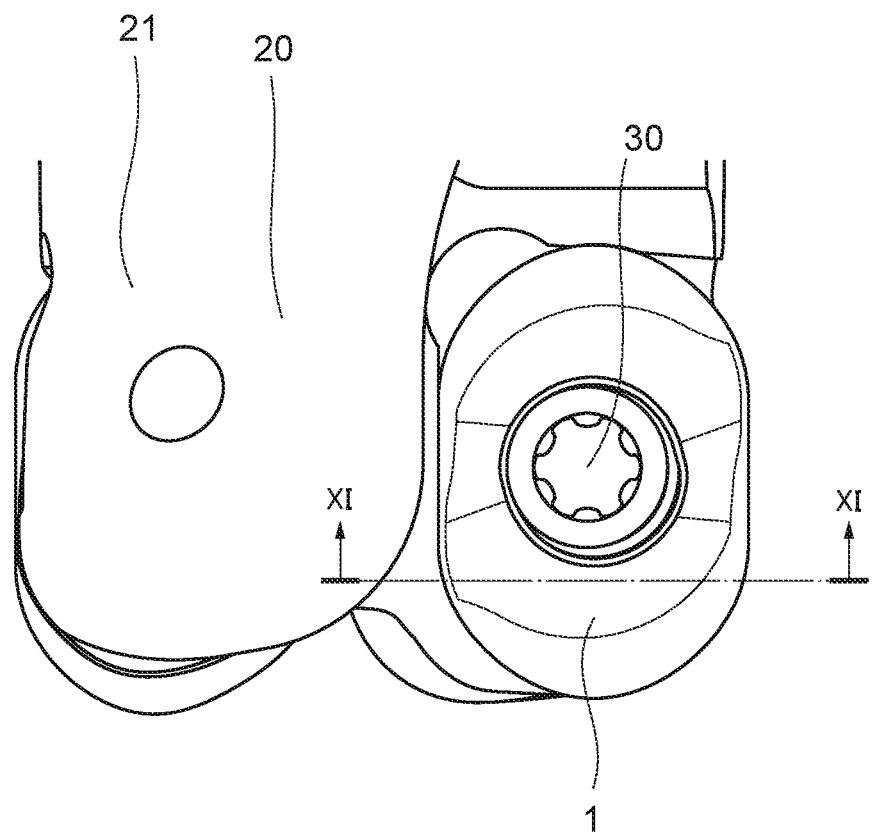
FIG. 10 is a partially enlarged perspective view illustrating a portion near the cutting insert in the cutting tool in FIG. 2.
Figure 11:
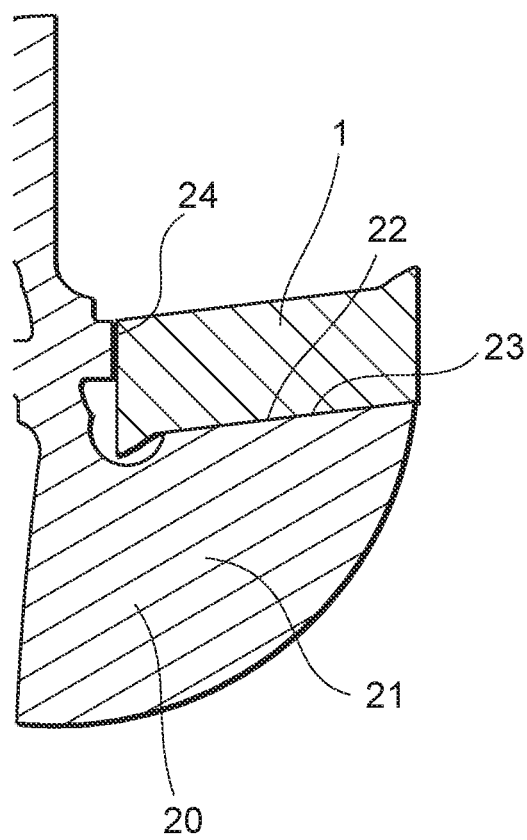
FIG. 11 is a sectional view cut along the line XI-XI in FIG. 10.

The lower surface 3 of the cutting insert 1 has a plurality of contact surface portions 6 which are arranged so as to be rotationally symmetrical with respect to the reference axis A. As shown in FIGS. 10 and 11, the contact surface portion 6 is a surface for bringing the cutting insert 1 into contact with an insert seat 22 when the cutting insert 1 is mounted on a cutting tool 20. More specifically, the contact surface portion 6 is a surface to be seated onto the insert seat 22 of a tool body 21. In the cutting insert 1 of the present embodiment, four contact surface portions 6 are formed in total—two on the upper surface 2 and two on the lower surface 3. Each of the four contact surface portions 6 has a substantially flat surface. More specifically, each contact surface portion 6 in this example is a plane. As shown in FIGS. 4 and 7, the contact surface portions 6 are formed around the mounting hole 7 so that they surround the hole 7. Although not shown in the drawings, the intersecting line between two virtual planes, which are defined by extending the two contact surface portions 6 on the lower surface 3, respectively, intersects with the reference axis A and extends parallel to the second reference plane C. In this example, of the contact surface portions 6 formed on the lower surface 3, the contact surface portion 6 which is formed on the side of the first circular-arc-shaped cutting edge 5*a*1 is referred to as a first contact surface portion 6*a*. That is, the first contact surface portion 6*a* is formed on the reverse side (lower side) of the rake surface associated with the first circular-arc-shaped cutting edge 5*a*1.

As shown in FIG. 8, a virtual plane that is defined by extending the contact surface portion 6 intersects with the second reference plane C with an acute angle of inclination θ. That is, the contact surface portion 6 forms an acute angle with the second reference plane C in a sectional view cut along the virtual plane D, i.e., a sectional view in the shorter-side direction. To put it another way, the contact surface portion 6 is inclined relative to the second reference plane C. In the cutting insert 1 of the present embodiment, the second reference plane C is parallel to the upper surface 2 and the lower surface 3. Thus, the contact surface portion 6 is part of the lower surface 3, but is an inclined portion in the lower surface 3. As described above, in the side views of FIGS. 5 and 6, the circular-arc-shaped cutting edge 5*a* is formed so as to be inclined relative to the second reference plane C and the lower surface 3. In FIG. 5, in particular, when attention is directed to the first circular-arc-shaped cutting edge 5*a*1 formed on the upper surface 2 side, the linear cutting edge 5*b* of the same cutting edge 5 is on the right side of FIG. 5, although this is not shown in the drawing. Thus, in FIG. 5, the first circular-arc-shaped cutting edge 5*a*1 is generally curved so as to approach the second reference plane C as it heads away from the linear cutting edge 5*b* of the same cutting edge 5. In the manner described above, the circular-arc-shaped cutting edge 5*a* is formed so as to be inclined relative to the second reference plane C and the lower surface 3.

Attention is now directed to the cutting edge 5 including the first circular-arc-shaped cutting edge 5*a*1 on the upper surface 2 side, and the first contact surface portion 6*a* formed on the reverse side (lower side) of the rake surface related to such first circular-arc-shaped cutting edge 5*a*1. In FIG. 5, the first circular-arc-shaped cutting edge 5*a*1 is inclined, from the above-mentioned apex of this first circular-arc-shaped cutting edge 5*a*1, so as to approach the second reference plane C as it heads away from the linear cutting edge 5*b* of the same cutting edge 5. Meanwhile, when turning to FIGS. 5 and 8, similarly to the inclination of the first circular-arc-shaped cutting edge 5*a*1, the first contact surface portion 6*a* is inclined in the shorter-side direction of the cutting insert 1 so as to become more distant from the second reference plane C as it heads away from the side of the linear cutting edge 5*b* which is paired with the above first circular-arc-shaped cutting edge 5*a*1.

In other words, as shown in FIG. 5, in a side view which is viewed from the direction that faces the virtual plane D, i.e., in a view from the front, the cutting edge 5 has an inclined portion which is inclined so as to make an acute angle with the second reference plane C. Meanwhile, although not shown in the drawings, when the shape of the inclined portion of the cutting edge 5 illustrated in the above front view is projected onto the sectional view of FIG. 8, the direction of inclination of the first contact surface portion 6*a* is the same as the inclination direction of the inclined portion of the cutting edge 5. That is, the inclination direction of the inclined portion of the cutting edge 5, when it is projected onto the sectional view of FIG. 8, also goes downward and to the left.

As shown in FIG. 9, in the sectional view cut along the first reference plane B, namely, in the sectional view in the longer-side direction, the contact surface portion 6 is formed so as to be approximately at a right angle to the reference axis A, i.e., approximately parallel to the second reference plane C.

For the material of the cutting insert 1, at least portions near the cutting edges 5 are made of hard materials, such as a cemented carbide, cermet, ceramic, and a sintered body containing cubic boron nitride, materials obtained by applying PVD or CVD coating to the surface of these hard materials, or a sintered body containing mono-crystalline diamond or diamond. It should be noted that portions other than the portions near the cutting edges 5 are preferably made of similarly hard materials.

Figure 1:
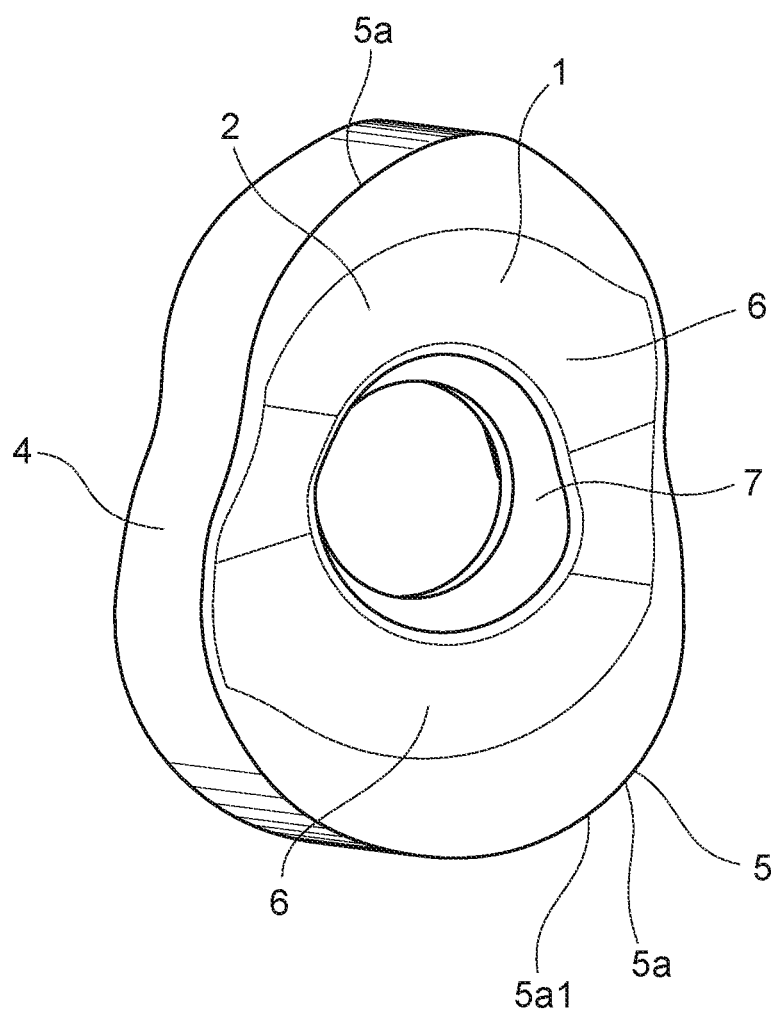
FIG. 1 is a perspective view of a cutting insert according to an embodiment of the present invention.
Figure 2:
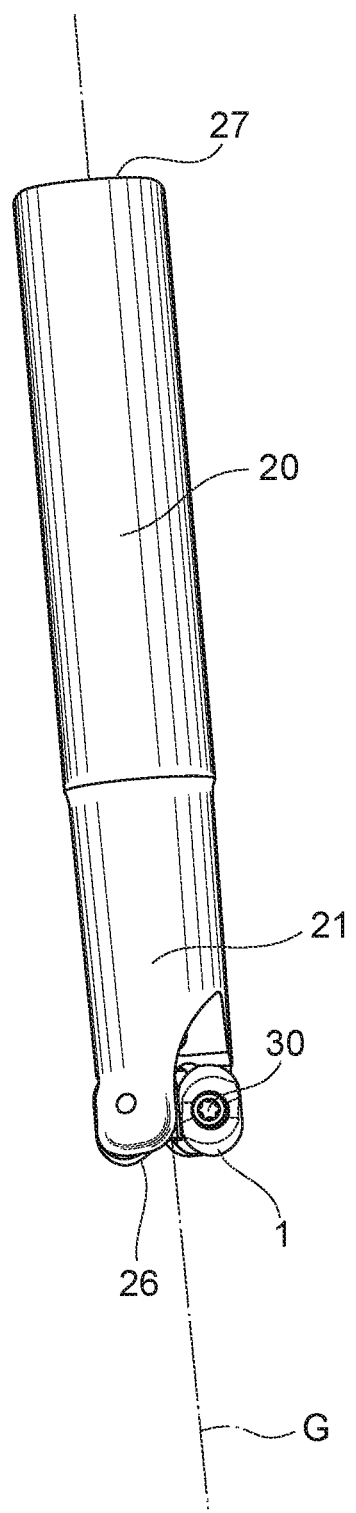
FIG. 2 is a perspective view of a cutting tool according to an embodiment of the invention, on which the cutting insert in FIG. 1 is mounted.

The cutting insert 1 having the above-described configuration is removably mounted on the insert seat 22 in the tool body 21 of the cutting tool 20 of the present embodiment with a clamping member 30 which is a mechanical attaching means. The cutting tool 20 on which the cutting insert 1 is mounted will be further described below with reference to FIGS. 2, 3 and 9. The cutting tool 20 of the present embodiment uses a fastening screw 30 as the clamping member 30.

The cutting tool 20 has a tool body 21 provided with a plurality of insert seats 22 (two seats in this example). One cutting insert 1 can be removably mounted on each insert seat 22. It should be noted that, although it is not shown in the drawings, the present invention does not exclude a cutting tool having a tool body provided with only one insert seat.

The tool body 21 is configured to rotate about a tool rotational axis G, which is defined so as to pass through the tool body 21 from the leading end 26 to the base end 27. In other words, the tool body 21 is generally formed in a substantially cylindrical shape. The two insert seats 22 are provided around the leading end 26 of the tool body 21 at equal distances. Each of a plurality of cutting inserts 21 used for this cutting tool 20 has the same configuration and the same shape. Thus, each of the plurality of insert seats 22 provided in the tool body 21 also has the same shape. The cutting tool 20 of the present embodiment is a rotary cutting tool. More specifically, the cutting tool 20 of the present embodiment is a radius end mill using the above-described cutting insert 1.

The cutting insert 1 is mounted on each insert seat 22 in the tool body 21 so that the upper surface 2 or the lower surface 3 faces forward in the direction of tool rotation around the tool rotational axis. Each insert seat 22 has a bottom surface 23 and a wall surface 24, and is open toward the leading end 26 and the outer periphery of the tool body 21. Here, a surface with which the upper surface 2 or the lower surface 3 of the cutting insert 1 can be brought into contact is called the bottom surface 23 of the insert seat 22, while a surface with which the peripheral side surface 4 of the cutting insert 1 can be brought into contact is called the wall surface 24. Accordingly, the bottom surface 23 faces forward in the direction of tool rotation around the tool rotational axis G.

A cutting insert 1 is placed on the insert seat 22 and fixed with a fastening screw 30 so that one of the cutting edges 5 in the cutting insert 1 is made available. Hereinafter, the configuration of the insert seat 22 will be specifically described in an example in which the cutting insert 1 is attached to the insert seat 22 so as to make the above-described first circular-arc-shaped cutting edge 5a1 available. In the cutting tool 20 illustrated in FIG. 2, the cutting insert 1 is mounted on the insert seat 22 so that the cutting edge 5 including the first circular-arc-shaped cutting edge 5a1 will serve as a working cutting edge. As already stated above, the cutting insert 1 is also attached to the insert seat in a similar way if each of the remaining three sets of cutting edges 5 is used as a working cutting edge, and thus, the descriptions thereof will be omitted here.

Figure 3:
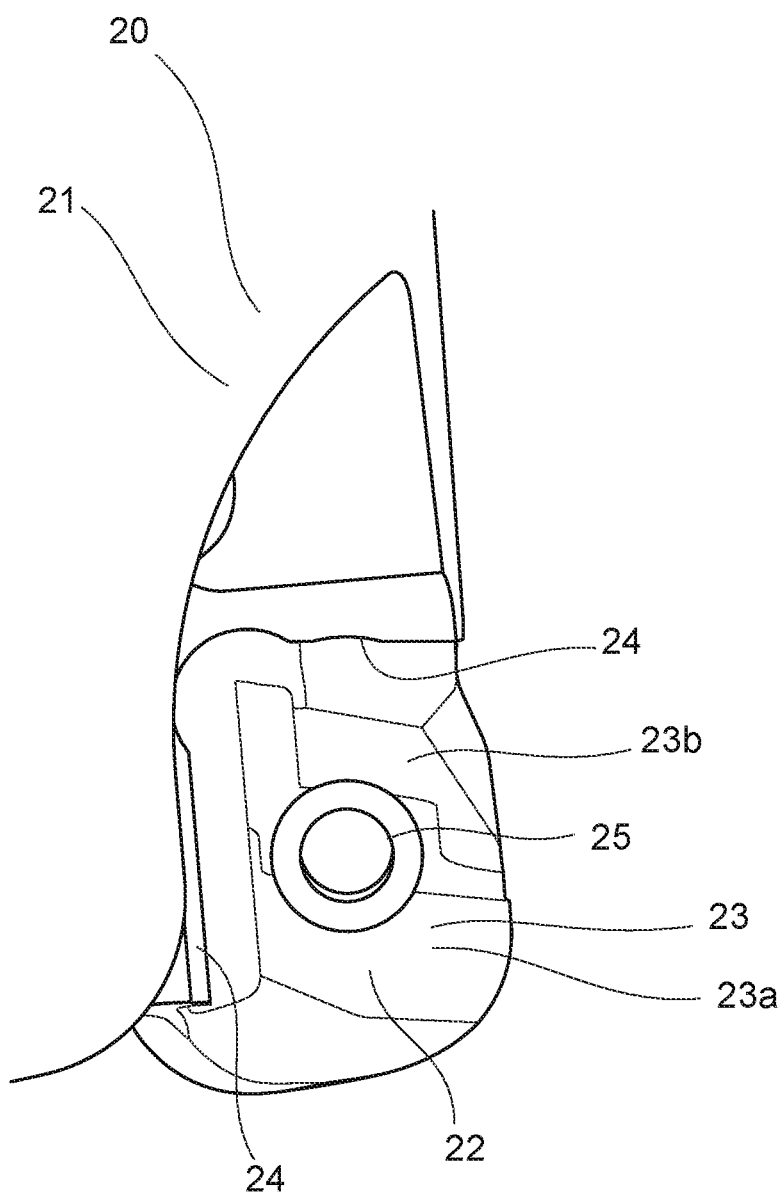
FIG. 3 is a partially enlarged perspective view illustrating a portion around an insert seat from which the cutting insert has been removed from the cutting tool in FIG. 2.

As shown in FIG. 3, a holding surface portion 23a and a threaded hole 25 are formed in the bottom surface 23 of the insert seat 22. The holding surface portion 23a is substantially planar and inclined so as to be raised toward the outer periphery away from the tool rotational axis. In other words, the holding surface portion 23a is arranged so as to be inclined forward in the tool rotating direction as it heads away from the tool rotational axis toward the outer periphery. The wall surface 24 of the insert seat 22 has a shape adapted to the peripheral side surface 4 of the cutting insert 1. In other words, the wall surface 24 of the insert seat 22 is designed to have a shape which is a combination of a curved surface portion and a planar surface portion. Since most of the peripheral side surface 4 in the cutting insert 1 of the present embodiment is curved as described above, the wall surface 24 of the insert seat 22, which is brought into contact with the peripheral side surface 4, is also configured such that most of the surface is curved. The threaded hole 25 is formed approximately perpendicularly to the bottom surface 23. Thus, the holding surface portion 23a is inclined relative to the threaded hole 25. However, the configuration is not limited to the one described above. The insert seat 22 may have any shape, as long as at least one contact surface portion 6 can be in contact with the holding surface portion 23a to fix the cutting insert 1, and a variety of conventional techniques can be applied. It should be noted that the threaded hole 25 in FIG. 3 is illustrated in a simplified manner, and an internal thread is actually formed in the inner surface of the threaded hole 25.

In addition, a secondary holding surface portion 23b is formed in the bottom surface 23 of the insert seat 22 on the opposite side of the holding surface portion 23a across the threaded hole 25. The holding surface portion 23a is located closer to the leading end 26 side of the tool body 21 than the secondary holding surface portion 23b, and is configured so that the first contact surface portion 6a which is provided on the reverse side of the rake surface associated with the working cutting edge 5 can be in contact with the holding surface portion 23a. The secondary holding surface portion 23b is configured in agreement with the inclination of the remaining contact surface portion 6 other than the first contact surface portion 6a on the lower surface 3 side, so that the remaining contact surface portion 6 can be in contact with the secondary holding surface portion 23b.

The operation and effects of the cutting insert 1 described above and the cutting tool 20 on which such cutting insert 1 is mounted will be described below.

When the cutting insert 1 is attached to the insert seat 22 so that the cutting edge 5 including the first circular-arc-shaped cutting edge 5a1 will be used as a working cutting edge, the first contact surface portion 6a comes into contact with the holding surface portion 23a. The direction of inclination of the first contact surface portion 6a is related to the direction of inclination of the first circular-arc-shaped cutting edge 5a1 of the working cutting edge, as described above. The cutting insert 1 is mounted on the cutting tool 20 so as to have an appropriate clearance angle with the flank of the working cutting edge. Accordingly, cutting resistance during cutting will act on the working cutting edge in a direction toward the outside of the flank. If the contact surface portion and the holding surface portion are formed parallel to the upper and lower surfaces of the cutting insert, a force is applied to the cutting insert so as to draw the cutting insert out of the insert seat. Since the cutting insert 1 of the present embodiment is configured such that the first contact surface portion 6a and the holding surface portion 23a are inclined relative to the upper surface 2 and lower surface 3, it is possible to suppress a force that moves the cutting insert 1 outward of the insert seat 22 due to cutting resistance, and it is also possible to further convert the above force into a force to move the cutting insert 1 inward. Moreover, in the insert seat 22, the cutting insert 1 is fitted into a substantially V-shaped portion between the holding surface portion 23a and the wall surface 24. This fitting is facilitated by an action of fastening the screw 30. The fastening action and its direction correspond to the direction in which the cutting insert tends to rotate during cutting. Thus, according to the cutting insert 1 and the cutting tool 20 of the present embodiment, it is possible to adequately suppress shifting of the cutting insert 1 during cutting.

Moreover, since rotation of the cutting insert 1 can be adequately suppressed by configuring the second end surface 3, acting as a seating surface, to have a shape with the above-described features, there is no need to form a special recessed portion on the peripheral side surface 4 of the cutting insert 1. Accordingly, it is possible to suppress a decrease in strength due to a decrease of the thickness around the cutting edges 5.

More detailed description will be made below. In addition to the operation and effects of the present embodiment, preferable modifications will also be described below.

Since the cutting insert 1 of the present embodiment has a circular-arc-shaped cutting edge 5a and a linear cutting edge 5b, as described above, it is suited for use as a cutting insert for a radius end mill or a ball end mill. That is, although the circular-arc-shaped cutting edge 5a is mainly used as a major cutting edge, the linear cutting edge 5b can also be used so as to constitute part of the major cutting edge. In such a case, the linear cutting edge 5b is preferably placed on the outer periphery side of the rotary cutting tool 20. In the cutting tool 20 of such preferable embodiment, the direction extending from the base end 27 to the leading end 26 of the cutting tool 20 corresponds to the direction (longer-side direction) in which the first reference plane B of the cutting insert 1 extends; while the direction extending from the tool rotational axis G to the outer periphery of the cutting tool 20 corresponds to the direction (shorter-side direction) in which the virtual plane D extends. Accordingly, a preferable form of the cutting insert 1 and a preferable form of the corresponding holding surface portion 23a are as set out below.

The cutting insert 1 has, on both the upper surface 2 and the lower surface 3, a plurality of contact surface portions 6 which are arranged so as to be rotationally symmetrical with respect to the reference axis A. Each contact surface portion 6 is formed so as to be inclined, in a sectional view along the shorter-side direction, relative to the second reference plane C which is orthogonal to the reference axis A by a predetermined inclination angle θ. The inclination angle θ of the contact surface portion 6 is preferably within the range of 3 degrees or more and 15 degrees or less. If the inclination angle θ is less than 3 degrees, it is not possible to effectively suppress a force to draw the cutting insert 1 out of the insert seat 22 due to cutting resistance during cutting. If the inclination angle θ exceeds 15 degrees, the contact surface portion 6 cannot be fixed stably against a principal component of force of the cutting resistance. To be more specific, if the inclination angle θ exceeds 15 degrees, the function of the holding surface portion 23a as a portion for holding a surface is degraded and excess load is applied to the wall surface 24 of the insert seat 22. In the cutting insert 1 of the present embodiment, the inclination angle is set to about 7 degrees. It should be noted that the inclination angle of the contact surface portion 6 in the sectional view along the longer-side direction shown in FIG. 9 is preferably within the range of zero or more degrees and 7 degrees or less. As described above, it is basically preferable for the inclination angle in the longer-side direction to also be configured such that it is inclined to approach the upper surface 2 as it heads toward the peripheral side surface 4, but it is not essential for such inclination in the longer-side direction to be formed. The inclination angle in the longer-side direction may be adjusted as appropriate, according to the inclination of the cutting edge 5.

The first contact surface portion 6a is configured so as to be able to come into contact with the corresponding holding surface portion 23a in the insert seat 22. The cutting insert 1 is placed in such insert seat 22 so that the reference axis A of the cutting insert 1 and the axis of the threaded hole 27 are almost parallel to each other, and the fastening screw 30 is screwed into the threaded hole 25 through the mounting hole 7, thereby fixing the cutting insert 1. Thus, in the cutting insert 1 which has been attached to the insert seat 22, the contact surface portion 6 on the seating surface is also formed so as to be inclined relative to the threaded hole 25. With the force of the fastening screw 30 holding down the cutting insert 1, the first contact surface portion 6a is securely held down to the holding surface portion 23a. Here, the cutting insert 1 is held downward, i.e., toward the bottom surface 23 of the insert seat 22 and, at the same time, it is also held securely in the direction of rotation around the reference axis A, i.e., in the lateral direction. In order to increase the force to fix the cutting insert 1, it is more effective if the cutting insert 1 can be securely fitted between the wall surface 24 and the holding surface portion 23a of the insert seat 22. The holding surface portion 23a is preferably inclined so as to be raised as it heads away from the wall surface 24 of the insert seat 22. In other words, the holding surface portion 23a preferably faces toward the wall surface 24 of the insert seat 22. The wall surface 24 of the insert seat 22 mostly faces toward the outer periphery of the cutting tool 20. Accordingly, it is preferable for the holding surface portion 23a to be inclined so as to be raised forward in the tool rotating direction in a direction away from the tool rotational axis of the cutting tool 20, i.e., heading toward the outer periphery of the cutting tool 20.

In the present invention, an embodiment in which the contact surface portion 6 and the holding surface portion 23a are inclined oppositely to the above is also possible. That is, an embodiment in which the holding surface portion 23a is inclined so as to be depressed as it heads away from the wall surface 24 of the insert seat 22 is also possible (not shown). In that case, the holding surface portion will act as an obstacle or a wall against the rotating direction of the cutting insert so as to thereby suppress the rotation of the cutting insert 1.

Part of the wall surface 24 of the insert seat 22 faces the leading end side of the cutting tool 20. As described above, in the sectional view along the longer-side direction, the contact surface portion 6 is arranged almost parallel to the second reference plane C. However, the contact surface portion 6 is not limited to this configuration. Although not shown in the drawings, the contact surface portion 6 may be arranged so as to be inclined in the sectional view along the longer-side direction. For example, if the contact surface portion 6 is inclined in the longer-side direction so as to make an acute inner angle relative to the peripheral side surface 4 which is brought into contact with the wall surface 24 of the insert seat 22, the cutting insert 1 can be more stably fixed and the cutting insert 1 is not shifted easily during cutting. It is preferable for such inclination of the contact surface portion 6 in the longer-side direction on the lower surface 3 to be such that the contact surface portion 6 is inclined to approach the second reference plane C as it heads toward the peripheral side surface 4. With such inclination of the contact surface portion 6, a substantially V-shaped portion is formed between the contact surface portion 6 and the part of the wall surface that faces the leading end side, and the cutting insert 1 can be fitted into that portion. It should be noted that since the contact surface portion 6 in the cutting insert 1 of the present embodiment is inclined in the shorter-side direction by an inclination angle θ as shown in FIG. 8, necessary and sufficient fixing stability is ensured even if the contact surface portion 6 is not inclined in the sectional view along the longer-side direction.

If the length of the linear cutting edge 5b is greater than the length of the circular-arc-shaped cutting edge 5a, shifting in the rotating direction can be prevented by bringing the planar portion of the peripheral side surface 4, which continues to such linear cutting edge 5b, into contact with the wall surface 24 of the insert seat 22 in a positive manner. Accordingly, the present invention is particularly effective when the length of the circular-arc-shaped cutting edge 5a is greater than that of the linear cutting edge 5b. It should be noted that the cutting insert 1 of the present embodiment is described such that, in a plan view, the entire part of the substantially semicircular portion is formed as the circular-arc-shaped cutting edge 5a, but the cutting insert 1 is not limited to this configuration. Sufficient functions as a ball end mill, a radius end mill or the like can be obtained if the circular-arc-shaped cutting edge 5a is formed at least in a range of a substantially quarter-circular arc (an arc portion obtained by dividing a circle into four equal parts) which continues to the linear cutting edge 5b. In other words, the contour shape of the upper surface 2 of the cutting insert 1 may be an asymmetric shape consisting of two substantially quarter-circular-arc-shaped portions and two substantially linear portions. The two substantially circular-arc-shaped portions may have different lengths from each other. This is because, if two or more cutting inserts are used in a ball end mill or the like, and if one cutting insert is placed so that its cutting edge traverses the tool rotational axis, the other cutting insert cannot be placed so that its cutting edge traverses the tool rotational axis due to interference. There may be some cases in which a cutting insert has two or more substantially quarter-circular-arc-shaped portions, the lengths of which are slightly different. If the cutting insert has an asymmetric shape having substantially quarter-circular-arc-shaped portions, the upper surface 2 and the lower surface 3 may have a contour shape which has symmetry of reflection. Accordingly, if cutting edges 5 are also formed on the lower surface 3 side, such cutting edges 5 may be formed as opposite-hand cutting edges. If the upper surface 2 and the lower surface 3 have a substantially elliptic shape, as in the cutting insert 1 of the present embodiment, a total of four cutting edges 5, which are the same right- or left-hand cutting edges, can be formed and such cutting insert is accordingly economical. As described before, if the cutting edges 5 are formed in only part of the intersecting edge of the first and second end surfaces 2 and 3, it is preferable to form a curved connecting portion that smoothly connects each of the cutting edges 5 in the remaining part of the intersecting edge. In such a case, the present invention is particularly effective if the length of the circular-arc-shaped cutting edge 5a is greater than that of the curved connecting portion in a plan view.

In addition to the holding surface portion 23a, at least one secondary holding surface portion 23b may be made so as to correspond to a plurality of contact surface portions 6. Two or more secondary holding surface portions 23b may also be made. The cutting insert 1 can be fixed securely to the cutting tool 20 even if the cutting tool 20 is in a form in which only the peripheral side surface 4 and one of the contact surface portions 6 in the cutting insert 1 are in contact with the insert seat 22. More specifically, the cutting insert 1 can be fixed securely even if the cutting insert 1 is in contact with the tool only at one portion between the contact surface portion 6 and the holding surface portion 23a. However, if at least one contact surface portion 6 is brought into contact with the secondary holding surface portion 23b simultaneously with bringing at least one contact surface portion 6 into contact with the holding surface portion 23a, shifting of the cutting insert 1 during cutting can be more effectively suppressed. In addition, fixation stability can be further enhanced if it is possible to bring a plurality of secondary holding surface portions 23b into contact with a plurality of contact surface portions 6. In that case, more preferably, each of the plurality of secondary holding surface portions faces in different directions. As shown in FIG. 3, the cutting tool 20 of the present embodiment has one secondary holding surface portion 23b. This is because the cutting insert 1 has two contact surface portions 6 on its lower surface 3 and it is accordingly preferable to have two corresponding holding surface portions 23a and 23b in total. If the peripheral side surface 4 of the cutting insert 1 comes into contact with the wall surface 24 of the insert seat 22, like in the cutting tool 20 of the present embodiment, it is preferable to manufacture the holding surface portion 23a, the secondary holding surface portion 23b and the contact surface portions 6 with high accuracy of form through a grinding process, etc., in order to bring the holding surface portion 23a and the secondary holding surface portion 23b into contact with their corresponding contact surface portions 6 in the cutting insert 1. If the insert seat 22 or the cutting insert 1 is not manufactured with high accuracy of form, the situation may arise in which only one of the contact surface portions 6 comes into contact with the insert seat 22. In other words, the cutting insert 1 may be fixed when contact is made at three points in a state where the peripheral side surface 4 and one of the contact surface portions 6 are in contact with the insert seat 22. If a plurality of secondary holding surface portions 23b is provided in such a state, it would be uncertain as to which of the secondary holding surface portions 23b is working and the fixation would be rather unstable. Since the cutting tool 20 of the present embodiment has only one secondary holding surface portion 23b, it is possible to simultaneously bring the two contact surface portions 6 into contact with the holding surface portion 23a and the secondary holding surface portion 23b, respectively, without the need to manufacture the contact surface portions 6 of the cutting insert 1 with a considerable level of accuracy of form, such as the accuracy obtained by the grinding process. In other words, due to the configuration in which the cutting insert has two contact surface portions 6 and the insert seat 22 has one holding surface portion 23a and one secondary holding surface portion 23b, the cutting tool 20 of the present embodiment enables the cutting insert 1 to be fixed to the insert seat 22 in a stable manner even if the cutting insert 1 is formed merely by means of pressing and sintering of powder material.

As described before, in a side view, the circular-arc-shaped cutting edge 5a is inclined so as to approach the second reference plane C and to the lower surface 3 as it heads away from the linear cutting edge 5b. In other words, the circular-arc-shaped cutting edge 5a is formed so as to be inclined with respect to the second reference plane C. The linear cutting edge 5b is also formed so as to be inclined with respect to the second reference plane C in a side view. The contact surface portion 6 is preferably formed such that, when the shape of the inclined portion of the cutting edge 5 in a side view is projected onto the sectional view (FIG. 8) cut along the virtual plane D, the inclination direction of the inclined portion is the same as the inclination direction of the contact surface portion 6. By configuring the inclination direction of the cutting edge 5 to be the same as the inclination direction of the contact surface portion 6 provided on the reverse side of the cutting edge 5, variation in the thickness of the cutting insert 1 can be suppressed. Accordingly, generation of a thin portion in the cutting insert 1 can be suppressed and the entire thickness can be regulated in a favorable manner. Since the cutting insert 1 does not have an excessively thin portion or an excessively thick portion, fracture of the cutting insert 1 does not occur easily during cutting and, furthermore, the cutting insert 1 is easy to manufacture and the manufacturing cost can be reduced. Although it is not shown in the drawings, more preferably, the projected shape of the inclined portion of the cutting edge 5 in the sectional view of FIG. 8 and the shape of the contact surface portion 6 are formed so as to be substantially parallel or offset with respect to one another. When the inclined portion of the cutting edge 5 and the contact surface portion 6 are formed so as to be substantially parallel or offset, the thickness of the cutting insert 1 can be equalized to the greatest extent. Here, an offset form means a form in which the two curved lines are placed parallel, keeping a specific distance therebetween.

In the cutting insert 1 of the present invention, the longer-side direction is defined as a direction passing through the reference axis A and the center E of the arc of the first circular-arc-shaped cutting edge 5a1 in a plan view. However, this is merely a definition for the purposes of description, and it is not essential to precisely determine the center of the arc of the cutting edge 5. If the cutting edge 5 has, for example, a form created by combining several circular arcs, and if the form cannot be approximated to a single circular arc, the center E may be determined by selecting a part of the substantially circular-arc-shaped portion of the working cutting edge, assuming a first circular-arc-shaped cutting edge 5a1 from the selected part, and approximating it into a circular arc. What is necessary is that, in order to prevent the cutting insert 1 from rotating during cutting, the first reference plane B is defined by taking into account the direction in which the contact surface portion 6 is inclined relative to the direction of such rotation and that the contact surface portion 6 is inclined relative to the second reference plane C in the virtual plane D which extends perpendicularly to such defined first reference plane B.

As described above, the cutting tool 20 of the present invention uses a fastening screw 30 as a clamping member 30. Known techniques, such as wedges and presser pieces, may be used for the clamping member 30. It is to be noted, however, that there may be cases where: an improved chip discharging efficiency is preferred when the cutting insert 1 is used for a radius end mill or a ball end mill which performs machining of the workpiece in three dimensions; a reduced cutting resistance is preferred in order to prevent the occurrence of chatter; or a rotary cutting tool 20 having a smaller diameter is preferred due to the limitation with respect to the diameter of the applicable tools. In light of such demands, the cutting tool 20 of the present invention preferably uses a fastening screw 30. By using a fastening screw 30, the cutting insert 1 can be easily mounted even if its contact surface portion 6 is located at a lower level than the cutting edge 5, i.e., the cutting insert 1 is formed to have a so-called raised cutting edge. Moreover, the chip discharging efficiency can be improved as there are no obstacles, such as wedges or presser pieces, on the rake surface side. In addition, the configuration is simple and is therefore advantageous for reducing size, and therefore, the applicable range can be broadened to tools having smaller diameters.

The above-described cutting tools can be attached to machine tools so as to be used for the cutting of steel, etc.

Embodiments of the cutting insert, tool body and cutting tool according to the present invention have been described above, but embodiments of the present invention are not limited to those described above.

For example, the shape of the circular-arc-shaped cutting edge 5a is not limited to a substantially semicircular shape or a substantially quarter-circular-arc shape. Furthermore, the cutting tool is not limited to a substantially cylindrical end mill, and the present invention can also be applied to face mill cutters, disk-like side cutters and the like. The present invention can be applied not only to a rotary cutting tool as in the above-described embodiment, but also to other forms of cutting tools, including turning tools and drilling tools, etc.

In the above-described embodiments and modifications, etc., the present invention has been described specifically in a given way, but the present invention is not limited to the described embodiments. It should be appreciated that various alterations and changes can be made to the present invention without departing from the gist and scope of the invention defined in the claims. The present invention encompasses all kinds of modifications, applications and equivalents that are encompassed by the idea of the present invention defined by the scope of the claims.

REFERENCE SIGNS LIST

1 Cutting insert
2 First end surface (upper surface)
3 Second end surface (lower surface)
4 Peripheral side surface
5 Cutting edge
5a Circular-arc-shaped cutting edge
5a1 First circular-arc-shaped cutting edge
5b Linear cutting edge (second cutting edge)
6 Contact surface portion
6a First contact surface portion
7 Mounting hole
20 Cutting tool
21 Tool body
22 Insert seat
23 Insert seat bottom surface
23a Holding surface portion
23b Secondary holding surface portion
24 Insert seat wall surface
25 Threaded hole
26 Leading end
27 Base end 30 Clamping member (fastening screw)
A Reference axis of cutting insert
B First reference plane
C Second reference plane
D Cut plane
E Center of arc of first circular-arc-shaped cutting edge
R Radius of curvature of arc in circular-arc-shaped cutting edge
θ Angle of inclination
G Tool rotational axis

What is claimed is:

1. A cutting insert (1) to be mounted onto a tool body (21), said cutting insert comprising first and second end surfaces (2, 3), a peripheral side surface (4) extending between the first and second end surfaces (2, 3), a central axis (A) perpendicular to the first and second end surfaces (2, 3) and passing through a center thereof, and a cutting edge (5) formed at least in part of an intersecting edge between the first end surface (2) and the peripheral side surface (4), wherein, in the cutting insert:
the cutting edge (5) includes at least one circular-arc-shaped cutting edge (5a) having a first circular-arc-shaped cutting edge (5a1) which forms part of a virtual circle having a center (E), the center (E) being spaced apart from the central axis (A) as viewed from a direction facing the first end surface (2);
the second end surface (3) comprises a contact surface portion (6) that is in contact with the tool body (21) when the cutting insert is mounted onto the tool body;
a longitudinal plane (B) includes the central axis (A) and the center (E) of the virtual circle;
a median plane (C) perpendicular to the central axis (A) passes midway between the two end surfaces (2, 3);
a longitudinal axis (L) is defined by the intersection of the longitudinal plane (B) and the median plane (C);
a virtual plane (D) perpendicular to both the longitudinal plane (B) and the median plane (C) intersects the first circular-arc-shaped cutting edge (5a1) and traverses the contact surface portion (6);
in a cross-section taken along the virtual plane (D), the contact surface portion (6) is inclined at a non-zero angle of inclination (8) relative to the median plane (C); and
at least one cutting edge (5) formed at an intersecting edge between the second end surface (3) and the peripheral side surface (4).

2. The cutting insert according to claim 1, wherein the contact surface portion (6) is inclined in the virtual plane (D) so as to make an acute angle with respect to the median plane (C), and an angle of the inclination (θ) is within a range of 3 degrees or more and 15 degrees or less.

3. The cutting insert according to claim 1, wherein:
the cutting insert (1) comprises a plurality of the circular-arc-shaped cutting edges (5a) and a plurality of the contact surface portions (6); and
the plurality of circular-arc-shaped cutting edges (5a) and the plurality of contact surface portions (6) are arranged so as to be rotationally symmetrical with respect to the central axis (A).

4. The cutting insert according to claim 1, wherein the cutting insert (1) comprises two of the circular-arc-shaped cutting edges (5a).

5. The cutting insert according to claim 1, wherein:
the cutting edge (5) includes a second cutting edge (5b);
the second cutting edge (5b) is formed linearly; and
the cutting edge (5) is formed such that a length of the circular-arc-shaped cutting edge (5a) is greater than a length of the second cutting edge (5b).

6. The cutting insert according to claim 1, wherein:
the cutting insert (1) comprises a plurality of the cutting edges (5);
a curved connecting portion that smoothly connects adjacent ones of the cutting edges (5) is formed at the intersecting edge between the first end surface (2) and the peripheral side surface (4); and
the circular-arc-shaped cutting edge (5a) is formed so as to have a greater length than that of the curved connecting portion.

7. The cutting insert according to claim 1,
wherein the contact surface portion (6) is formed as a substantially flat surface.

8. The cutting insert according to claim 1, wherein:
in a side view of the insert along the longitudinal axis (L), the cutting edge (5) has an inclined portion forming an acute angle with respect to the median plane (C); and
the direction of inclination of the contact surface portion (6) in the virtual plane (D) is the same as the direction of inclination which is obtained when the shape of the inclined portion of the cutting edge (5) in the side view is projected onto the virtual plane (D).

9. The cutting insert according to claim 8, wherein the contact surface portion (6) is formed so as to have, in the virtual plane (D), a shape which is substantially parallel or offset relative to the inclined portion of the cutting edge (5) which is projected onto the virtual plane (D).

10. The cutting insert according to claim 1,
wherein at least part of the first end surface (2) is configured to act as a rake surface.

11. A tool body (21) on which the cutting insert (1) according to claim 1 is mounted, the tool body (21) comprising at least one insert seat (22), wherein the insert seat (22) has a holding surface portion (23a) which comes into contact with at least one of the contact surface portions (6).

12. The tool body according to claim 11, which is a tool body (21) of a rotary cutting tool (20), wherein the holding surface portion (23a) is inclined forward in a tool rotating direction heading away from a tool rotational axis (G) of the rotary cutting tool (20).

13. A cutting tool comprising:
a tool body (21) comprising at least one insert seat (22); and
a cutting insert (1) according to claim 1 removably mounted on the insert seat (22), wherein
the insert seat (22) has a holding surface portion (23a) which comes into contact with the contact surface portion (60); and
the cutting tool being a radius end mill or a ball end mill.

14. The cutting tool according to claim 13, wherein:
the cutting insert (1) comprises a mounting hole (7);
the cutting tool (20) comprises a fastening screw (30) which comes into contact with the mounting hole (7); and
the insert seat (22) of the tool body (21) has a threaded hole (25) into which the fastening screw (30) is screwed.

15. The cutting tool according to claim 13, wherein:
the cutting edge (5) of the cutting insert (1) includes a second cutting edge (5b);
the second cutting edge (5b) is substantially linear when viewing the cutting insert (1) from a direction facing the first end surface (2); and the cutting insert (1) is placed on the insert seat (22) so that the second cutting edge (5b) is placed along an outer periphery of the tool body (21).

16. The cutting tool according to claim 13, wherein:
the cutting tool (20) is a rotary cutting tool;
the cutting edge (5) of the cutting insert (1) includes a second cutting edge (5b);
the second cutting edge (5b) is substantially linear when viewing the cutting insert (1) from a direction facing the first end surface (2); and
the cutting insert (1) is placed on the insert seat (22) so that the second cutting edge (5b) is substantially parallel to a tool rotational axis (G) in a side view of the cutting tool (20).

17. The cutting insert according to claim 1, wherein:
the cutting insert is indexable with 180° rotational symmetry about the central axis (A); and
the cutting insert is reversible, having identical first and second end surfaces (2, 3).

18. A cutting insert (1) to be mounted onto a tool body (21), said cutting insert comprising first and second end surfaces (2, 3), a peripheral side surface (4) extending between the first and second end surfaces (2, 3), a central axis (A) perpendicular to the first and second end surfaces (2, 3) and passing through a center thereof, and a cutting edge (5) formed at least in part of an intersecting edge between the first end surface (2) and the peripheral side surface (4), wherein, in the cutting insert:

the cutting edge (5) includes at least one circular-arc-shaped cutting edge (5a) having a first circular-arc-shaped cutting edge (5a1) which forms part of a virtual circle having a center (E), the center (E) being spaced apart from the central axis (A) as viewed from a direction facing the first end surface (2);
the second end surface (3) comprises a contact surface portion (6) that is in contact with the tool body (21) when the cutting insert is mounted onto the tool body;
a longitudinal plane (B) includes the central axis (A) and the center (E) of the virtual circle;
a median plane (C) perpendicular to the central axis (A) passes midway between the two end surfaces (2, 3);
a longitudinal axis (L) is defined by the intersection of the longitudinal plane (B) and the median plane (C);
a virtual plane (D) perpendicular to both the longitudinal plane (B) and the median plane (C) intersects the first circular-arc-shaped cutting edge (5a1) and traverses the contact surface portion (6);
in a cross-section taken along the virtual plane (D), the contact surface portion (6) is inclined at a non-zero angle of inclination (8) relative to the median plane (C); and
a mounting hole (7) that penetrates the first and second end surfaces (2, 3), wherein the central axis (A) is in agreement with an axis of the mounting hole (7).

* * * * *